(12) United States Patent
Varekamp et al.

(10) Patent No.: US 10,944,952 B2
(45) Date of Patent: Mar. 9, 2021

(54) METHOD AND APPARATUS FOR PROCESSING AN IMAGE PROPERTY MAP

(71) Applicant: KONINKLIJKE PHILIPS N.V., Eindhoven (NL)

(72) Inventors: Christiaan Varekamp, Veldhoven (NL); Patrick Luc Els Vandewalle, Oud-Turnhout (BE)

(73) Assignee: Koninklijke Philips N.V., Eindhoven (NL)

( * ) Notice: Subject to any disclaimer, the term of this patent is extended or adjusted under 35 U.S.C. 154(b) by 12 days.

(21) Appl. No.: 16/479,972

(22) PCT Filed: Jan. 31, 2018

(86) PCT No.: PCT/EP2018/052318
§ 371 (c)(1),
(2) Date: Jul. 23, 2019

(87) PCT Pub. No.: WO2018/145961
PCT Pub. Date: Aug. 16, 2018

(65) Prior Publication Data
US 2019/0356895 A1 Nov. 21, 2019

(30) Foreign Application Priority Data

Feb. 7, 2017 (EP) .................................... 17155076

(51) Int. Cl.
*G06K 9/00* (2006.01)
*H04N 13/128* (2018.01)
(Continued)

(52) U.S. Cl.
CPC .......... *H04N 13/128* (2018.05); *G06T 5/002* (2013.01); *G06T 5/50* (2013.01); *G06T 7/593* (2017.01);
(Continued)

(58) Field of Classification Search
CPC ....... H04N 13/128; G06T 7/593; G06T 5/002; G06T 5/50; G06T 19/20;
(Continued)

(56) References Cited

U.S. PATENT DOCUMENTS 6,751,338 B1  6/2004  Wallack
8,619,082 B1 * 12/2013  Ciurea ............... G02B 27/0075
345/427

(Continued)

OTHER PUBLICATIONS

R. Bergman: "Comprehensive Solutions for Automatic Removal of Dust and Scratches From Images" SPIE, Jan. 2008, Section 3.2.
(Continued)

*Primary Examiner* — Aaron W Carter

(57) ABSTRACT

An apparatus comprises receiver (101) receiving a light intensity image, confidence map, and image property map. A filter unit (103) is arranged to filter the image property map in response to the light intensity image and the confidence map. Specifically, for a first position, the filter unit (103) determines a combined neighborhood image property value in response to a weighted combination of neighborhood image property values in a neighborhood around the first position, the weight for a first neighborhood image property value at a second position being dependent on a confidence value for the first neighborhood image property value and a difference between light intensity values for the first position and for the second position; and determines a first filtered image property value for the first position as a combination of a first image property value at the first position in the image property map and the combined neighbor image property value.

20 Claims, 2 Drawing Sheets

(51) Int. Cl.
*G06T 7/593* (2017.01)
*G06T 5/00* (2006.01)
*G06T 5/50* (2006.01)
*G06T 19/20* (2011.01)

(52) U.S. Cl.
CPC .... *G06T 19/20* (2013.01); *G06T 2207/10012* (2013.01); *G06T 2207/10024* (2013.01); *G06T 2207/10028* (2013.01)

(58) Field of Classification Search
CPC .......... G06T 2207/10012; G06T 2207/10024; G06T 2207/10028; G06T 5/001
See application file for complete search history.

(56) References Cited

U.S. PATENT DOCUMENTS

| | | | |
|---|---|---|---|
| 9,582,889 B2* | 2/2017 | Shpunt | G06T 7/593 |
| 2011/0273529 A1 | 11/2011 | Lai et al. | |
| 2012/0321172 A1* | 12/2012 | Jachalsky | G06T 7/593 |
| | | | 382/154 |
| 2013/0156332 A1 | 6/2013 | Tian | |
| 2014/0063188 A1* | 3/2014 | Smirnov | H04N 13/122 |
| | | | 348/43 |
| 2014/0079336 A1 | 3/2014 | Venkataraman et al. | |
| 2014/0093159 A1* | 4/2014 | Nguyen | G06T 19/20 |
| | | | 382/154 |
| 2017/0223331 A1* | 8/2017 | Varekamp | H04N 13/122 |
| 2017/0295355 A1 | 10/2017 | Takaka | |
| 2018/0027224 A1* | 1/2018 | Javidnia | H04N 13/271 |
| | | | 382/154 |
| 2018/0150964 A1* | 5/2018 | Varekamp | G06K 9/6292 |
| 2018/0295340 A1* | 10/2018 | Varekamp | H04N 13/122 |
| 2018/0309974 A1* | 10/2018 | Varekamp | H04N 13/106 |
| 2019/0356895 A1* | 11/2019 | Varekamp | G06T 7/593 |

OTHER PUBLICATIONS

International Search Report from PCT/EP2018/052318 dated Apr. 24, 2018.

* cited by examiner

METHOD AND APPARATUS FOR PROCESSING AN IMAGE PROPERTY MAP

CROSS-REFERENCE TO PRIOR APPLICATIONS

This application is the U.S. National Phase application under 35 U.S.C. § 371 of International Application No. PCT/EP2018/052318, filed on Jan. 31, 2018, which claims the benefit of EP Patent Application No. EP 17155076.7, filed on Feb. 7, 2017. These applications are hereby incorporated by reference herein.

FIELD OF THE INVENTION

The invention relates to a method and apparatus for processing an image property map and in particular, but not exclusively, to processing of a depth or disparity map.

BACKGROUND OF THE INVENTION

Traditionally digital images and video frames simply constituted of a single image providing light intensity information (including color) reflecting the light properties of the scene. However, in recent years, the representation of images has become increasingly complex with additional information often representing a number of different properties. For example, rather than an image simply consisting in a single light intensity image, many representations of a scene now comprise additional light intensity images, depth maps, transparency maps, confidence maps etc.

Such additional information may be provided in order to allow the receiving/rendering end to have more flexibility and control over the image being rendered. An example is the provision of additional depth information, such as e.g. the provision of a depth map (or equivalently disparity map) for the light intensity image. This can allow a receiver/renderer to perform view point shifting or to e.g. generate stereo images for 3D viewing.

However, in many practical scenarios, the image properties may be imperfect and affected by noise or errors. For example, depth information may not be as accurate as desired. Indeed, in many scenarios depth information is generated by estimating and extracting depth values by comparing view images for different view directions. However, such estimations tend to be relatively noise and error prone.

Specifically, in many applications, three dimensional scenes are captured as stereo images using two cameras at slightly different positions. Specific depth values may then be generated by estimating disparities between corresponding image objects in the two images. However, such depth extraction and estimation is problematic and tends to result in non-ideal depth values. This may again result in artefacts and a degraded three dimensional image quality.

Three dimensional image degradation and artefacts tend to be particularly significant for transitions between different image objects. Further, determination of depth information based on disparity estimation for associated images are also typically related to consideration of characteristics of image objects. Typically, disparity estimation algorithms search for correspondences between a left and right image by comparing color differences locally between a point in the left image and its corresponding point in the right image. However, the image properties and the process may be relatively noisy resulting in the generated depth map also being relatively noisy.

In order to improve such depth maps, post-filtering of the depth map has been proposed. A particular post-filtering approach is a bilateral color and/or luminance adaptive filter wherein the filtering kernel is adapted to reflect the visual properties of the image. Such a bilateral filter may result in the depth map being adapted to more closely follow the characteristics of the image, and it may result in improved consistency and temporal stability of the estimated disparities, or may e.g. provide a sharper depth transition between different image objects.

Joint bilateral filtering may include up-sampling and is a technique used to filter or up-sample e.g. a depth map given an associated light intensity image as a 'guidance' signal. The general idea is that the 'guidance' signal is less noisy or of higher resolution and that it can thus provide information relating to which samples should be given lower or higher weight in a weighted averaging of a typically spatio-temporal neighborhood around the pixel to filter.

However, although such filtering, and specifically bilateral filtering, may improve the image property map being filtered, it tends to not provide optimum performance and the resulting image property map may still include artefacts, errors, inaccuracies and/or noise.

Hence, an improved approach for processing an image property map would be advantageous and in particular an approach allowing increased flexibility, facilitated implementation, reduced complexity, reduced artefacts/error/inaccuracies and/or noise, and/or improved quality and/or performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for processing an image property map, the apparatus comprising: a receiver for receiving a light intensity image, a confidence map, and an image property map, the light intensity image comprising light intensity values for pixels of the light intensity image, the image property map comprising image property values for the pixels of the light intensity image and the confidence map comprising confidence values for the image property values; a filter unit arranged to filter the image property map in response to the light intensity image and the confidence map, to generate a filtered image property map, the filter unit being arranged to, for a first position in the filtered image property map: determine a combined neighborhood image property value in response to a weighted combination of neighborhood image property values being image property values in a neighborhood around the first position, the weight for a first neighborhood image property value at a second position being dependent on a confidence value for the first neighborhood image property value and a difference between a light intensity value for the first position and a light intensity value for the second position; and determine the first filtered image property value for the first position as a combination of a first image property value at the first position in the image property map and the combined neighbor image property value; wherein the filter unit is arranged to determine the weight for the first neighborhood image property value in response to a difference measure for the confidence value for the first neighborhood image property value and a confidence value for the first image property value.

The invention may allow an improved image property map to be generated. The filtered image property map may be determined in response to different properties and modalities and may provide a more accurate reflection of the correct image property values in many scenarios and embodiments. For example, in many embodiments, an improved filtering of a depth map can be achieved resulting in an output filtered depth map that can be used e.g. to perform view point shifts with higher resulting image quality. Thus, an improved user experience can often be achieved based on the resulting filtered image property map.

The approach may provide an improved filtering wherein both confidence and light intensity values can simultaneously be used to control and guide a filtering of an image property map, such as a depth map. The consideration of the different properties may be integrated into a combined simultaneous and integrated operation. This may reduce quality and provide improved performance. For example, the specific approach allows the joint consideration of both confidence and light intensity values without these undesirably interfering with each other or resulting in errors or artefacts.

The difference between the light intensity value for the first position and the light intensity value for the second position may be determined in accordance with any suitable difference measure. For example, it may be determined as a norm for the difference between the light intensity values.

The weighted combination of neighborhood image property values may specifically be a weighted summation of neighborhood image property values. In some embodiments, the weighted combination of neighborhood image property values may include all neighborhood image property values within the neighborhood. In other embodiments, it may only include a subset of these, for example a subsampling may be applied to the neighborhood image property values in the neighborhood.

The combination of the first image property value at the first position in the image property map and the combined neighbor image property value may be a weighted summation.

The neighborhood may be a neighborhood/region that includes the first position. Such a neighborhood/region may also be referred to as a kernel.

The weight for the first neighborhood image property value may be a monotonically increasing function of the confidence value for the first neighborhood image property value (where the confidence value has an increasing value for increasing confidence).

The weight for the first neighborhood image property value may be a monotonically decreasing function of the difference between the light intensity value for the first position and the light intensity value for the second position The confidence value for the first neighborhood image property value may be the confidence value at the second position in the confidence map.

The difference measure for the confidence values may be any suitable difference measure.

In accordance with an optional feature of the invention, the filter unit is arranged to:

determine a weight for the first image property value relative to a weight for the combined neighbor image property value in response to a confidence value for the first image property value.

This may result in an improved filtered image property map being generated in many scenarios and embodiments.

The weights for the combination of the first image property value at the first position in the image property map and the combined neighbor image property value may be dependent on the confidence value for the first image property value/at the first position in the confidence map.

The weight for the first image property value relative to the weight for the combined neighbor image property value may be a monotonically increasing function of the confidence value for the first image property value.

In accordance with an optional feature of the invention, the filter unit is arranged to determine the combined neighbor image property value substantially as:

$$D_{neighbor} = \frac{\sum \alpha_j f_j g_j D_j}{\sum \alpha_j f_j g_j}$$

where $f_j$ represents a difference measure for a light intensity value for the second position and a light intensity value for a neighborhood image property value at the second position; $g_j$ represents a confidence difference measure for the confidence value $C_i$ for the first depth value $D_i$ and a confidence value for the neighborhood image property value at the second position; $D_j$ represents the neighborhood image property value at the second position; $\alpha_j$ represents a design parameter, and the summations is over all positions/belonging to the neighborhood.

This may provide a particularly advantageous operation in many embodiments and may specifically result in an improved filtered image property map being generated in many scenarios and embodiments.

The design parameter $\alpha_j$ may be dependent on other parameters, such as e.g. a distance between the first position and the second position.

In accordance with an optional feature of the invention, the determination of the weight is asymmetric with respect to the confidence value for the first neighborhood image property value and the confidence value for the first image property value.

This may provide a particularly advantageous operation in many embodiments and may specifically result in an improved filtered image property map being generated in many scenarios and embodiments.

In accordance with an optional feature of the invention, the difference measure is limited to a minimum value which is only exceeded if the confidence value for the first neighborhood image property value exceeds the confidence value for the first image property value by a threshold.

This may provide a particularly advantageous operation in many embodiments and may specifically result in an improved filtered image property map being generated in many scenarios and embodiments.

The minimum value may be zero and/or the threshold may be zero.

In accordance with an optional feature of the invention, the light intensity image, the confidence map, and the image property map are part of a temporal sequence of light intensity images, confidence maps, and image property maps, and the neighborhood has a temporal extension.

This may provide improved performance in many embodiments, and may in particular often provide improved temporal stability and consistency.

In accordance with an optional feature of the invention, the filter unit is arranged to increase a confidence value for an image property value if this is a filtered image property value.

This may provide a particularly advantageous operation in many embodiments and may specifically result in an improved filtered image property map being generated in many scenarios and embodiments.

The image property value may in many embodiments be considered a filtered image property value if it is part of a filtered image property map generated by a previous filtering of an image property map of the sequence of image property maps.

In accordance with an optional feature of the invention, the neighborhood is spatially asymmetric with respect to the first position.

This may provide improved performance in many embodiments.

In accordance with an optional feature of the invention, the image property map is a depth indication map comprising depth values determined from disparity estimation in a first image representing a first view point and a second image representing a second view point and having the first view point as the basis for the disparity estimation; and the neighborhood extends further in a direction from the second view point towards the first view point than in a direction from the first view point towards the second view point.

This may provide an improved filtered image property map in many scenarios and embodiments wherein disparity estimation is used. It may reflect the asymmetry in the underlying disparity estimation between images corresponding to different view points.

In accordance with an optional feature of the invention, the weight is further dependent on a distance between the first position and the second position.

This may provide an improved filtered image property map in many scenarios and embodiments In accordance with an optional feature of the invention, the receiver is further arranged to receive a second image property map and a second confidence map, second confidence map comprising second confidence values for second image property values of the second image property map; and wherein the filter unit is further arranged to determine the weight for the first neighborhood image property value in response to a second image property value for the second position and a second confidence value for the second position.

This may provide a particularly advantageous operation in many embodiments, and may specifically result in an improved filtered image property map being generated in many scenarios and embodiments.

In accordance with an optional feature of the invention, the image property map is one of: a depth map; a disparity map; a motion estimation map; and a transparency map.

The invention may in many embodiments allow an improved depth map; disparity map; motion estimation map; or transparency map to be generated. This may allow improved subsequent image processing of e.g. the light intensity image and thus improve image quality and provide an improved user experience.

According to an aspect of the invention there is provided method of processing an image property map, the method comprising: receiving a light intensity image, a confidence map, and an image property map, the light intensity image comprising light intensity values for pixels of the light intensity image, the image property map comprising image property values for the pixels of the light intensity image and the confidence map comprising confidence values for the image property values; filtering the image property map in response to the light intensity image and the confidence map, to generate a filtered image property map, the filtering comprising, for a first position in the filtered image property map: determining a combined neighborhood image property value in response to a weighted combination of neighborhood image property values being image property values in a neighborhood around the first position, the weight for a first neighborhood image property value at a second position being dependent on a confidence value for the first neighborhood image property value and a difference between a light intensity value for the first position and a light intensity value for the second position; and determining a first filtered image property value for the first position as a combination of a first image property value in the image property map at the first position and the combined neighbor image property value; wherein determining the combined neighborhood image property value comprises determining the weight for the first neighborhood image property value in response to a difference measure for the confidence value for the first neighborhood image property value and a confidence value for the first image property value.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to the processing of an image property map in the form of a depth map. However, it will be appreciated that the invention is not limited to this application but may be applied to many other types of image property map.

Figure 1:
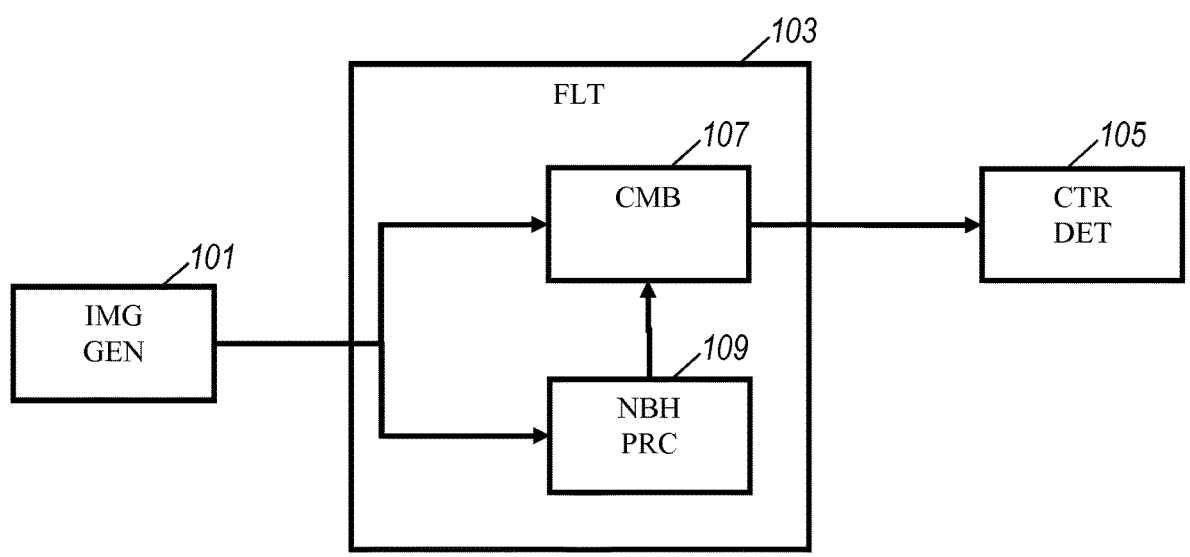
FIG. 1 illustrates an example of elements of an apparatus for processing an image property map, such as a depth map, in accordance with some embodiments of the invention.

FIG. 1 illustrates an example of an apparatus for processing an image property map, which in the specific example is a depth map.

The apparatus comprises a receiver 101 which is arranged to receive image data comprising a light intensity image and an associated confidence map and image property map, which specifically may be a depth map.

The light intensity image may comprise values that reflect a light intensity value for the individual pixels of an image to be rendered/displayed by a display.

It will be appreciated that the light intensity values may be any value indicative of a light intensity, and may specifically be a light intensity for e.g. one color channel. For example, a light intensity value may be an R, G or B value of an RGB representation, or may e.g. be an Y value of an Yuv representation, or may indeed be a u or v value of such a Yuv representation. It is noted that the u and v values may be chroma values and that these also provide information relating to the light intensity of individual color channels when rendering. Thus, a light intensity value may be a luminance, chrominance, or indeed chroma value of a color representation. Typically, the light intensity image comprises light intensity pixel values indicative of a chrominance property for the corresponding pixels. A chrominance property for a pixel may be indicative of a luminance property, a chroma property, or both a chroma and luminance property for the pixel.

The image property map comprises image property values for the pixels/positions of the light intensity image. In the specific example, the image property map is a depth map which comprises information about the depths of the pixels in the light intensity image. The depth map may specifically comprise depth values directly indicating a depth for the light intensity values of the light intensity image, such as a z-coordinate.

It will be appreciated that disparity information is a form of depth information and that the depth map is equivalently a disparity map. In some embodiments, the depth map may comprise a disparity value for the light intensity values of the light intensity image. It will be appreciated that references to depth in the following description are equally applicable to embodiments using direct depth/z values and to embodiments using disparity values.

Although the following description will focus on embodiments wherein the image property is a depth property, the approach can be applied to other image properties and thus in other embodiments the image property map may be a map indicative of a different image property. Specifically, the image property map may be a transparency map comprising data values indicative of a transparency of the pixels of the light intensity image. Such a transparency map is also typically known in the field as an a-map.

The confidence map comprises confidence values for the image property values, i.e. for the depth or transparency values of the image property map. It will be appreciated that the concept of confidence values to reflect a reliability or accuracy of a parameter is well known in the field of image processing. The confidence value for an image property value may indicate an (estimated) likelihood that the image property value has the correct value. Confidence values are generated as the outcome of many estimation processes that seek to estimate or determine a parameter value. For example, depth estimation typically not only generates a depth estimate representing the estimated depth but also generates a confidence value which indicates the confidence in the depth estimate reflecting the actual depth of the image object being estimated.

In many embodiments, the image property map may comprise an individual image property value for each light intensity value of the light intensity image. However, in many embodiments, an image property value may e.g. be common to plurality of light intensity values. For example, in many embodiments, the image property map may be of a lower resolution than the light intensity image and indeed the process described in the following may be used to upsample the image property map.

Similarly, the confidence map may have a different resolution than the light intensity image and indeed may also in some embodiments have a different resolution than the image property map. In some embodiments, a value of the confidence map may be common to a plurality of image property values of the image property map, and thus may have a lower resolution. However, in most embodiments, the confidence map will have the same resolution as the image property value and will comprise a confidence value for each image property value.

In some embodiments, the receiver 101 may receive a single independent set of (at least) a light intensity image and an associated image property map and confidence map. A set of a light intensity image and associated data including the image property map and the confidence map (as well as potentially other associated image property maps or light intensity images, e.g. for other view points) will be referred to as a composite image. A composite image may thus be considered to be the set of all the image data relating to a specific time instant.

In some embodiments, the composite image may be a part of a temporal sequence of composite images. Thus, the light intensity image may be part of a temporal sequence of light intensity images, and each light intensity image may have one or more associated image property maps and confidence maps. Accordingly, the image property map and confidence map for the current light intensity image may also be part of a temporal sequence of image property maps and confidence maps.

Specifically, the composite image may be part of a video sequence of images with typically each image having an associated image property map and confidence map.

The receiver 101 is coupled to a filter unit 103 which is arranged to filter the image property map in dependence on both the light intensity image and the confidence map. As will be described in detail later, the filter unit 103 thus performs a filtering of the image property map that takes into account both the light intensity values and the confidence values for the image property map. The filtering accordingly at the same time takes into account two different modalities in addition to the image property value itself.

The filter unit 103 is in the specific example of FIG. 1 coupled to a transmitter 105 which is arranged to generate a suitable output signal from the filtered light intensity image and transmit it to a suitable source. For example, the transmitter 105 may be arranged to apply a suitable image or video encoding process to the light intensity image to generate a suitable signal for distribution. E.g. the transmitter may apply an MPEG encoding to the filtered light intensity image(s) allowing the resulting bitstream to be distributed. The image property value and possibly the confidence map may be included in the output bitstream in many embodiments. In other examples, the transmitter 105 may be arranged to generate a suitable display drive signal which can be fed directly to a display to drive this to render and present the light intensity image(s) based on the filtered image property map.

Improvement of an image property map based on another property, such as a light intensity property or a confidence property may improve the quality of the image property map. However, conventional approaches are typically designed to consider only one parameter and the combination of different modalities and properties is a complex and challenging problem. It may not only require a significant increase of the resource demand and complexity but may also have unpredictable and undesirable effects (e.g. the different processes for the different modalities can typically interfere with each other in possibly unpredictable ways).

In the system of FIG. 1, the filter unit 103 is arranged to perform a combined, integrated, and simultaneous processing of the image property map based on both light intensity values and confidence values. In particular, the Inventors have not only realized that it is not only possible but also desirable to process the image property map based on different properties but also that rather than perform a sequential process as would be thought necessary or appropriate, it is possible to perform an integrated and combined filtering which can simultaneously combine information provided by different properties and modalities.

This operation will be described in the following with specific consideration of a depth map being filtered.

The filter unit 103 specifically comprises a combiner 107 with is arranged to determine filtered output values of the image property map. In the specific example, the resolution of the input image property map and the resulting output filtered image property map will be of the same resolution. Accordingly, the position of a filtered image property value has a direct correspondence with an image property value of the input image property map, or in other words the input image property map and the output filtered image property map have directly corresponding pixels. The position in the output filtered image property map for which the current value is determined will in the following be referred to as a first position and using the index i. It will be appreciated that such a reference and index may equally relate to the corresponding position in the input image property map, or indeed to the corresponding positions in the confidence map or the light intensity image. Similarly, a position in a neighborhood of the first position i will be referred to as a second position j. It will be appreciated that a position in the output filtered image property map has corresponding positions in the input image property map, the confidence map, and the light intensity image. Indeed, it is noted that it is standard practice in the field that different images and maps of a composite/combined image have corresponding positions in all maps/images (even if these are at different resolutions).

An input first image property value and output first filtered image property value at the first position may be referred to by the index i. For the image property map being a depth map, the index i thus denotes an input first depth value $D_i$ and an output first filtered depth value $D_{i,out}$.

It will also be appreciated that positions generally correlate with pixels and thus the terms position and pixel will be used interchangeably as appropriate. Specifically, a pixel or value with index i represents the corresponding value at the first position and a pixel or value with index j represents the corresponding value at the second position.

For this first filtered depth value $D_{i,out}$ (and thus for the first position) the combiner 107 generates an output value $D_{i,out}$ which depends on the input value $D_i$ and a depth/image property value which is determined based on depth/image property values in a neighborhood around the position/pixel i, i.e. around the position of the output value of $D_{i,out}$ and the first depth value $D_i$. This value determined in a region around position i is referred to as a combined neighbor image property/depth value $D_{i,neighbors}$.

The filter unit 103 is accordingly arranged to determine a filtered first image property value for the value/pixel/position/index i as a combination of the input first depth value $D_i$ and the combined depth neighbor value $D_{i,neighbours}$. The combiner 107 may accordingly determine the filtered output value as:

$$D_{i,out}=f(D_{i,in},D_{i,neighbors})$$

where $f( )$ is a weighted combination.

In some embodiments, a simple predetermined combination may e.g. be used, such as:

$$D_{i,out}=\alpha D_i+(1-\alpha)D_{i,neighbors}$$

where $\alpha$ is a predetermined constant between 0 and 1.

The combined neighborhood depth value $D_{i,neighbors}$ is determined by a neighborhood processor 109 which is part of the filter unit 103 and is coupled to the combiner 107.

The neighborhood processor 109 is for each depth value i in the output depth map arranged to determine a combined neighborhood depth value $D_{i,neighbors}$ as a weighted combination of the depth values in a given neighborhood. Such a weighted combination may be considered to correspond to a filtering, which specifically may be a spatial filtering when only a spatial neighborhood is considered, a temporal filtering when only a temporal neighborhood is considered, or both a spatial and temporal filtering when both a spatial and temporal neighborhood is considered. It will also be appreciated that the term kernel is often used in the field for such a neighborhood forming the basis of filtering, and the terms neighborhood and kernel will accordingly both be used to refer to the neighborhood as appropriate in the context.

Thus, in the system a kernel or neighborhood is defined and the neighborhood processor 109 can generate a combined neighborhood depth value $D_{i,neighbors}$ by combining the depth values that belong to the kernel/neighborhood around the position of the depth value for which the filtered depth value is determined. The combined neighborhood depth value $D_{i,neighbors}$ can accordingly be seen as a weighted average of the depth values in the kernel/neighborhood.

The combined neighborhood depth value $D_{i,neighbors}$ can accordingly be determined as:

$$D_{i,neighbours}=C_{j\in K_i}(w_j,D_j)$$

where $K_i$ represents the kernel/neighborhood for the position in the confidence map and light intensity image corresponding to pixel/position i (i.e. the first position) in the depth maps, and j is the index used for the neighborhood pixel position (i.e. the second position). $Cj\in K_i$ denotes weighted combination over (typically all) indexes j that are in the kernel/neighborhood K for pixel/position i with the weights for a given neighborhood depth value $D_j$ being given by $w_j$.

Specifically, in many embodiments, the combined neighborhood depth value $D_{i,neighbors}$ may be given by a weighted summation of the neighborhood depth values $D_j$:

$$D_{i,neighbours}=\Sigma_{j\in K_i}w_jD_j$$

Thus, the combined neighborhood depth value $D_{i,neighbors}$ is determined by a weighted averaging of neighborhood depth values $D_j$ in the neighborhood around the position of first depth value $D_i$.

In the approach, the weights for this combination are determined based on both the light intensity image and the confidence map. Specifically, for a first neighborhood depth value $D_j$, the weight $w_j$ in the combination is dependent on both the confidence value $C_j$ for position j and a difference between the light intensity value $I_j$ for position j and the light intensity value $I_i$ for position i, i.e. the weight $w_j$ is dependent on the confidence value for the first neighborhood depth value $D_j$ and the difference between the light intensity value $I_j$ for the first neighborhood depth value $D_j$ and the light intensity value $I_i$ for the first depth value $D_i$. In particular, the weight $w_j$ in the combination is dependent on the confidence value $C_j$ for position j relative to the confidence value for the pixel/position i for which the combined neighborhood depth value $D_{i,neighbors}$ is determined, i.e. it is determined based on the value of the confidence value $C_j$ relative to confidence value $C_i$. The weight $w_j$ is determined on the basis of a difference measure between the confidence value for the neighborhood image property value $C_j$ and the confidence value for the "anchor" position or value, $C_i$. The weight can specifically be determined as $$w_j=f(d_C(C_j;C_i);d_I(I_j;I_i))$$

where $f$ is a suitable function depending on the specific embodiment, $d_C(C_j; C_i)$ represents a suitable difference measure for the confidence values at position i and j respectively, and $d_I(I_j; I_i)$ represents a suitable difference measure for the light intensity values at position i and j respectively. Suitable difference measures for the intensity values may e.g. be a suitable norm $\|I_i; I_j\|$ based on the light intensities, and in particular on the light intensity difference vector $I_i-I_j$, i.e. $\|I_i-I_j\|$. Similarly, suitable difference measures for the intensity values may e.g. also be a suitable norm. In many embodiments, a direct difference value obtained by simple subtraction may be used, e.g. $d_C(C_j; C_i)=C_j-C_i$.

The weight for a given neighborhood depth value $D_j$ will typically increase for an increasing confidence value $C_j$ relative to the reference confidence value $C_i$, i.e. the more reliable the neighborhood depth value $D_j$ is considered to be relative to the reliability of the original depth value for the pixel currently being filtered, the higher neighborhood depth value $D_j$ is weighted in the combination. Specifically, the weight for a neighborhood depth value $D_j$ is typically a monotonically increasing function of the confidence value $C_j$ for neighborhood depth value $D_j$ and is typically a monotonically decreasing function of the confidence value $C_i$ for the depth value of position i. In many embodiments, the weight is a monotonically increasing function of the difference measure for the confidence intensity values at position i and j respectively.

The weight for a given neighborhood depth value $D_j$ will typically decrease for an increasing difference value, i.e. the higher the difference between the light intensity value $I_j$ for position j and the light intensity value $I_i$ for position i, the lower it is weighted in the combination. Specifically, the weight $w_j$ for a neighborhood depth value $D_j$ is typically a monotonically decreasing function of the difference measure/value indicative of the difference between the light intensity value $I_j$ for position j and the light intensity value $I_i$ for position i. Specifically, the function $f$ may be a monotonically decreasing function of a norm $\|I_i; I_j\|$, and specifically $\|I_i-I_j\|$.

The approach thus determines a combined neighborhood depth value $D_{i,neighbors}$ which has higher contribution from neighborhood depth values $D_j$ for which the confidence value is high relative to the confidence value for the original depth value for the current position, and the difference in light intensity to that of the current pixel is low. The approach thus allows for an efficient, simultaneous, and joint adjustment and variation of the contributions made by individual values with this variation being dependent on different properties and modalities.

The filter unit 103 may be arranged to proceed to perform this filtering operation for all positions/pixels of the depth map to generate a filtered depth map.

The approach may provide an improved depth map in many embodiments. In particular, it provides a cross-filtering based on multiple properties and modalities. Further, this has been found in practice to provide excellent results and allows for not only a computationally efficient process but also mitigates and reduces the interference and interdependence between filtering operations based on different modalities. It has been found to provide substantially improved performance in comparison to more straightforward and more intuitive approaches of performing a cascaded and sequential processing and bilateral filtering.

For many practical scenarios, it has been found that a more accurate and reliable image property map, and specifically depth map, may be generated providing improved support for e.g. subsequent image processing of the light intensity image. For example, improved image view point switching may be found in many practical scenarios leading to improved image quality and an improved user experience.

As mentioned the combiner 107 is arranged to generate the output filtered depth value $D_{i,out}$ by combining the first depth value $D_i$ and the combined neighborhood depth value $D_{i,neighbors}$. In some embodiments, this combination may be a weighted combination with predetermined weights, such as for example determining the output filtered depth value $D_{i,out}$ as the average of the first depth value $D_i$ and the combined neighborhood depth value $D_{i,neighbors}$.

However, in many embodiments, the weight for the first depth value $D_i$ relative to the combined neighborhood depth value $D_{i,neighbors}$ may be determined in response to the confidence value for the first depth value $D_i$, referred to as the first confidence value $C_i$. The weight for the first depth value $D_i$ relative to the combined neighborhood depth value $D_{i,neighbors}$ may typically be a monotonically increasing function of the first confidence value $C_i$. Thus, the more confidence there is in the existing depth value, the less is the potential modification based on depth values in the neighborhood.

It will be appreciated that the relative weighting between the first depth value Di and the combined neighborhood depth value Di,neighbors may be changed by changing a weight of the first depth value Di, a weight of the combined neighborhood depth value Di,neighbors, or indeed both the weights of the first depth value Di and the combined neighborhood depth value Di,neighbors.

In many embodiments, the output filtered depth value Di,out may specifically be determined as:

$$D_{i,out}=C_iD_i+(1-C_i)D_{i,neighbors}$$

Thus, in such an example, in the case where e.g. a disparity estimate used to generate the first depth value Di is considered confident ($C_i=1$), then the neighbour pixels do not contribute to the output filtered depth value Di,out. In the other extreme where there is no confidence in the current value ($C_i=0$) the output filtered depth value Di,out is based on neighbor pixels only.

In some embodiments, the neighborhood processor 109 may further be arranged to determine a neighborhood confidence value for the combined neighborhood depth value Di,neighbors. This neighborhood confidence value may be determined based on the confidence values for the neighborhood depth values Dj (i.e. the confidence values Cj of the neighborhood pixels). For example, the average of the neighborhood confidence values may be determined or e.g. the weighted average where the weights $w_1$ are taken into consideration may be determined.

In such a case, the weighting of the first depth value $D_i$ relative to the combined neighborhood depth value $D_{i,neighbors}$ may be determined based on the confidence level for the first depth value $D_i$ relative to the neighborhood confidence value. For example, the output filtered depth value $D_{i,out}$ may be determined as:

$$D_{i,out} = \frac{C_i}{C_i+C_{i,neighbor}}D_i + \frac{C_{i,neighbor}}{C_i+C_{i,neighbor}}D_{i,neighbors}$$

where $C_{i,neighbor}$ represents the neighborhood confidence value.

It will be appreciated that different approaches and functions may in different embodiments be used for performing the combination to determine the combined neighborhood depth value $D_{i,neighbors}$.

In some embodiments, the weight $w_j$ for a neighborhood depth value $D_j$ is determined to be proportional to a value $g_j$ that is dependent on the confidence value for the neighborhood depth value $D_j$ but not on the light intensity values. Further, the weight $w_j$ may be proportional to a value $f_j$ that is dependent on the difference measure for the light intensity values but is not dependent on the confidence value. Thus, in some embodiments, separate measures may be determined based on the confidence map and the light intensity image and these measures may be combined by multiplication when determining the weight $w_j$.

In some embodiments, the combined neighborhood depth value $D_{i,neighbors}$ for a given first depth value $D_i$ may be determined as $$D_{neighbors} = \frac{\sum \alpha_j f_j g_j D_j}{\sum \alpha_j f_j g_j}$$

where $f_j$ represents a difference measure for the light intensity $I_i$ value for the first depth value $D_i$ and the light intensity value $I_j$ for neighborhood depth value $D_j$; $g_j$ represents a confidence difference measure for the confidence value $C_i$ for the first depth value $D_i$ and a confidence value $C_j$ for neighborhood depth value $D_j$; and $\alpha_j$ represents a design parameter. The summations are over the pixels/values of the neighborhood, i.e. $j \in K_i$ where $K_i$ is the neighborhood/kernel for position i.

Thus, in some embodiments, the combined neighborhood depth value $D_{i,neighbors}$ may be determined as:

$$D_{i,neighbors} = \sum w_j \cdot D_j$$

where $$w_j = \frac{\alpha_j f_j g_j}{\sum \alpha_j f_j g_j}.$$

In some embodiments, $\alpha_j$ may simply be set to 1, i.e.:

$$w_j = \frac{f_j g_j}{\sum f_j g_j}.$$

where $g_j$ depends on a difference between $C_j$ and Ci, and $f_j$ typically depends on a norm for the color difference vector: $I_i - I_j$.

It will be appreciated that different approaches for finding the measures $f_j$ and $g_j$ may be used in different embodiments.

For example, a particularly advantageous approach for determining the value $f_j$ may in many embodiments be given by:

$$f_j = e^{-\gamma \|I_i - I_j\|}$$

where $\|I_i - I_j\|$ is a suitable norm for the colour difference vector: $I_i - I_j$ and $\gamma$ is a design parameter that may be used to control the relative significance of the light intensity difference relative to the confidence value.

A particularly advantageous approach for determining the value g may in many embodiments be:

$$g_j = e^{\beta(C_j - C_i)}$$

where $\beta$ may be a design parameter that may be used to control the relative significance of the confidence value relative to the light intensity difference.

The weight $w_j$ is accordingly not only dependent on the confidence value $C_j$ but also on the confidence value $C_i$ for the first depth value $D_i$. Specifically, the weight $w_1$ is in many embodiments advantageously dependent on a difference measure between confidence value $C_j$ and confidence value $C_i$. This may for example be achieved by making the value $g_j$ dependent on both the confidence value $C_j$ and the confidence value $C_i$, and specifically on the difference between these, e.g.

$$g_j = f(C_j - C_i).$$

The function $f(C_j - C_i)$ may specifically be a non-linear function that provides a proportionally higher weight to neighborhood depth values $D_j$ the more the confidence value $C_j$ is above the confidence value $C_i$. Thus, the approach will increase the focus on neighborhood depth values $D_j$ that have higher confidence than the first depth value $D_i$. Thus, in many embodiments, the weight $w_j$ may be determined as an asymmetric weight that is asymmetric with respect to confidence value $C_j$ and the confidence value $C_i$. It is specifically not merely the absolute difference between these but also the sign is important and affects the generated weight $w_j$.

In many embodiments, the weight $w_1$ may be dependent on a difference measure indicative of a difference between confidence value $C_j$ and confidence value $C_i$ and with the difference measure being limited to a minimum value that is only exceeded if the confidence value $C_j$ exceeds confidence value $C_i$ by a threshold. The minimum value and the threshold may specifically be zero, and the difference measure may for example be determined as:

$$\max(C_j - C_i, 0).$$

In such embodiments, the weight $w_j$ may be based on a contribution from the confidence value $C_j$ for the neighborhood depth value $D_j$ given by:

$$g_j = f(\max(C_j - C_i, 0))$$

where $f( )$ is a suitable function, such as for example $$g_j = e^{-\beta(1 - \max(C_j - C_i, 0))}.$$

In some embodiments, the weight $w_j$ may also be dependent on a distance between the position i of the first filtered depth value $D_{i,out}$ and the position of the neighborhood depth value $D_j$.

For example, the value $\alpha_j$ may be made dependent on the distance between the positions corresponding to the indexes i and j. It will be appreciated that any suitable distance measure may be used, such as specifically a distance measure based on a suitable norm. As a specific example, $\alpha_j$ may reflect a distance function such as:

$$\alpha_j = e^{-\psi((x_j - x_i)^2 + (y_j - y_i)^2)}.$$

where $\psi$ is a design parameter and x,y reflect the Euclidian positions corresponding to indexes i and j.

As previously mentioned, the light intensity image, the confidence map, and the image property map may be part of a temporal sequence of light intensity images, confidence maps, and image property maps, i.e. the receiver 101 may receive a sequence of combined images. Specifically, the receiver 101 may receive a video signal comprising the sequence of combined images and specifically each light intensity image may be a frame of a video sequence.

In such examples, the neighborhood, i.e. the kernel, may have a temporal extension, i.e. the neighborhood may include depth values from depth maps for typically frames/time instants prior to the current frame/time instant (although it is also possible for the neighborhood to include depth values that belong to subsequent frames/time instants).

In such embodiments, the spatial extension of the neighborhood may be different for the different frames/time instants. Typically, the spatial extension of the neighborhood is larger for the light intensity image and confidence map provided for the same time instant as the image property map being filtered than for other time instants.

The temporal extension may provide improved performance and may in particular provide improved spatial consistency and reduced perceived temporal noise.

In some embodiments, the image property map for another time instant may be one that has already been filtered. For example, the apparatus may be arranged to filter the current image property map based on a neighborhood/kernel that also includes the image property map for the previous frame/time instant. However, as this has already been processed by the filter unit 103 it may accordingly be a filtered image property map. This approach may provide improve performance as the image property values of the filtered image property map may be more reliable due to the filtering.

The filter unit 103 may further be arranged to modify the confidence values to reflect such an improved reliability. Specifically, the filter unit 103 may be arranged to increase a confidence value for an image property value if this is a filtered image property value. The increase may in some embodiments be a relative increase, such as adding a specific offset (say increasing the confidence value by 0.5 (with the result being limited to a maximum of 1.0), or may be an absolute setting such as setting the value to 1.0.

Such an approach will result in a higher weighting of image property values considered to be more reliable due to a previous filtering and accordingly may provide improved filtering of the current image property map.

Figure 2:
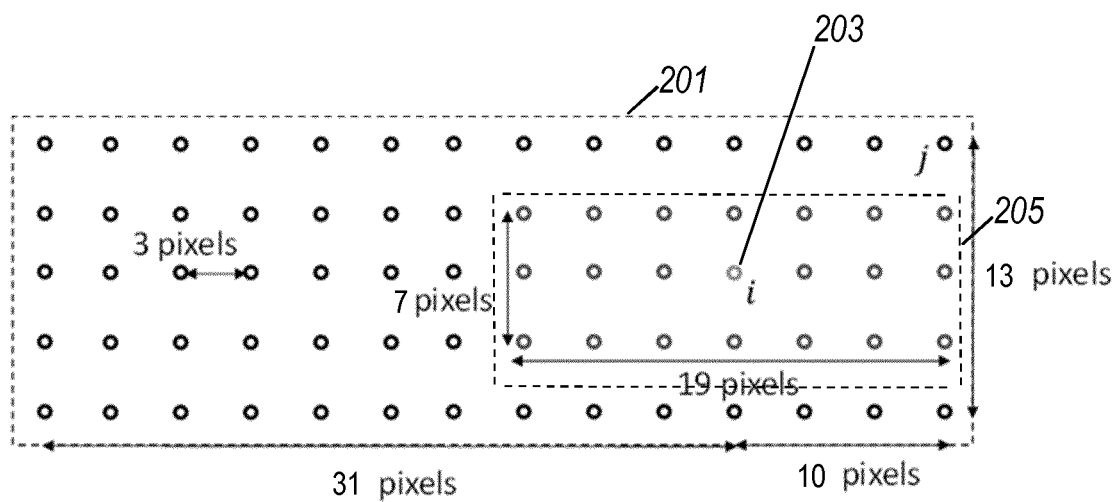
FIG. 2 illustrates an example of a kernel used by the apparatus of FIG. 1.

An example of a neighborhood/kernel 201 which may be suitable for many embodiments is illustrated in FIG. 2.

In the specific example, the kernel 201 for a given first depth value $D_i$ comprises a group 205 of 20 pixel positions closest to the position 203 of the first depth value $D_i$. This group 305 of pixel positions reflects spatial pixel positions that are comprised in kernel 201 for the current depth map and for the previous depth map, i.e. it reflects a spatial group of pixels for which the kernel 201 also has a temporal extension.

The remaining part of the kernel defines 49 pixel positions that are only included in the kernel 201 for the current time instant/frame. Thus, for these 49 pixel positions, the kernel 201 has no temporal extension.

It should also be noted that in the example, the depth values are subsampled, i.e. the kernel 201 does not include all depth values within the region of the kernel but rather defines only a subset of these. In the specific example, the subsampling may be by a factor of 3, and thus only every third depth value is considered for the filtering/kernel 201.

Accordingly, although the kernel 201 consists of 69 spatial positions, it covers a region or area corresponding to 40 by 13 pixels in the depth map. Such subsampling allows a larger area to be considered by the filtering while allowing a reduced complexity and processing resource requirement, in other words the sub-sampling may reduce computations while keeping a large filter kernel.

In the example, the neighborhood/kernel 201 is furthermore asymmetric with respect to the position of the first filtered depth value $D_{i,neighbors}$ and thus with respect to the first depth value $D_i$ (i.e. it is asymmetric with respect to the position 203 of the current pixel, i.e. with respect to position i).

This asymmetry may be particularly suitable e.g. for scenarios wherein the depth map is generated based on disparity estimation in at least two images. Specifically, a depth map (including a disparity map where depth is represented by a disparity) may comprise depth values that have been generated by disparity estimation between two images with different view points. For example, disparity estimation may be performed between a left eye image and a right eye image.

In such an example, the light intensity image may be provided for the left eye view point and the filtered depth map may be generated for this left eye view point using the left eye light intensity image as the basis. However, in such a case, the light intensity image and indeed the input depth map is more likely to have occluded regions to the right of a foreground object than to the left of the foreground object as the left eye view point allows background to be seen to the left of foreground object which will be occluded for a right eye view point.

The opposite will be the case for a right eye view point, i.e. in this case occluded areas will tend to extend more to the left side of a foreground object than to the right side.

Thus, in such a scenario, a disparity estimation may not be able to find the image area corresponding to a background which is de-occluded in the left eye image in the right eye image as it may be occluded in this. As a consequence, the disparity estimation will tend to generate areas of high uncertainty to the left of foreground images. Further the correct depth values for these regions is likely to lie to the left of the area than to the right as it will be more likely to reflect the background rather than the foreground object.

This may be taken into account by having a spatially asymmetric kernel.

Specifically, using the left eye image as a reference, the kernel may in many embodiments advantageously extend further in the left direction than in the right direction, as indeed reflected in the example of FIG. 2. Clearly, the symmetric situation occurs if the right eye image is used as the basis for the disparity estimation and therefore the kernel in such an example extends further to the right than to the left.

Thus, in scenarios wherein the depth map comprises depth values determined from disparity estimation in a first image representing a first view point and a second image representing a second view point and where the first view point as the basis for the disparity estimation, the neighborhood/kernel may be designed to extend further in the direction from the second view point towards the first view point than in the direction from the first view point towards the second view point.

A similar situation occurs in a structured light based depth sensor where an (infrared) structured light source and an (infrared) image sensor have a different spatial location in the sensor housing to form a baseline for depth capture. In this scenario certain parts of the scene that will be images by the sensor will not be illuminated by the light source (due to the baseline between these two). Also here, knowledge of the 3D direction vector between structured light source and sensor can be used to shape the filter kernel asymmetrically.

The previous description has focused on a scenario wherein all images and maps are considered to have the same resolution. However, it will be appreciated that the described principle is equally applicable to scenarios in which the resolution may be different, and in particularly may be suitable for e.g. upsampling of an image property map based on a light intensity image of higher resolution.

In the examples, the depth/disparity map is accompanied by an associated confidence map indicating the confidence of the depth values. For example, the depth map may represent disparity estimates and the confidence map may quantify how reliable the resulting estimate is. Another example is an infrared light based depth sensor that typically also outputs a confidence map which quantifies the measurement accuracy.

Typically, light intensity images do not have associated confidence maps or indications as such images are typically directly captured or generated and are assumed to be fully confident everywhere. However, in some embodiments, the filtering may be in response to a third property in addition to the light intensity values and the confidence values for the depth map. In such examples, the third property may also have associated confidence values. For example, the third property may be a motion estimation property and e.g. for each pixel a motion vector and associated motion confidence value may be provided. The determination of the weights for the neighborhood depth values $D_j$ may further be determined based on these values.

Specifically, in some embodiments, the receiver may accordingly also receive a second image property map and a second confidence map where the second confidence map comprises second confidence values for second image property values of the second image property map. For example, the composite images may also comprise a motion vector map and a motion confidence map.

In such embodiments, the determination of a weight $w_j$ for a neighborhood depth value $D_j$ may also be in response to both the second image property value, specifically the motion vector, and the second confidence value, specifically the motion confidence value, for position j (and in some embodiments also for position i).

For example, a scenario may be considered wherein an infrared based depth sensor (structured light or time of flight) is used to capture a depth map. If the sensor also contains a color image sensor then this color image sensor will typically have a much higher spatial resolution. Moreover, if we now over time use the sensor (depth and image) to capture a sequence of e.g. a static scene by moving the sensor (scanning), the image sensor can be used to estimate a pixel precise motion field $v_{k,k+1}$ between frames k and k+1. Since the transitions in this motion field typically change with depth discontinuities (the sensor was translated), the motion field can be used to e.g. up-scale/filter the depth map of the infrared sensor. However, the motion field is the result of a correspondence estimation process between image $I_k$ and $I_{k+1}$ and will therefore have spatially varying confidence values.

This motion field may be represented by a motion vector map and the motion confidence values may be represented by a motion confidence map. The weight for a given neighborhood depth value $D_j$ may then be dependent on the values of these maps at position j and possibly also at position i.

Specifically, the combined neighborhood depth value $D_{i,neighbors}$ can be determined as:

$$D_{i,neighbors} = \frac{\sum f_j g_j h_j D_j}{\sum f_j g_j h_j},$$

where $h_j$ represents a value which is dependent on both the motion value at position j and the confidence level at position j. Typically, $h_j$ is dependent on the difference between the motion value at position j and position i. For example, $h_j$ may be given as:

$$h_j = \min(C_{v_i}, C_{v_j}) e^{-\rho \|v_i - v_j\|}$$

where ρ is a design parameter that can be set to vary the weight of the motion data in the overall filtering, $\|v_i - v_j\|$ reflects the difference between the motion values at positions i and j and $C_{v_i}$ and $C_{v_j}$ represent the motion confidence values at position i and j respectively.

Using $\min(C_{v_i}, C_{v_j})$ to weigh this term is one logical solution since when motion is reliable both at center position i and neighbor position j then the difference $\|v_i - v_j\|$ is likely reliable. If either i or j has a low confidence, then the difference $\|v_i - v_j\|$ is likely to be less reliable. However, it will be appreciated that other approaches can be used in other embodiments.

For example, in such a scenario, the described filtering may be performed for each position in the output image property map, i.e. for each position in the high resolution depth map. The neighborhood may be determined at this high resolution and for each pixel in this high resolution neighborhood, a contribution to the combined neighborhood image property value may be determined. In such a case, the same input image property value and confidence value may be used for all high resolution positions within the same low resolution pixel. However, the light intensity values will differ as these are provided at the higher resolution and thus an effective upsampling of the received low resolution image property map based on the high resolution light intensity image can be achieved.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

A pixel can be considered what in the general prior art is termed as sub-pixel, that is to say a single color pixel like e.g. a red pixel. However in above described invention the term pixel may also be considered to comprise a group of subpixels, thus for instance a pixel may be an RGB-pixel, RGBY-pixel, etc.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. An apparatus for processing an image property map, the apparatus comprising:
    a receiver circuit,
        wherein the receiver circuit is arranged to receive a light intensity image, a confidence map, and an image property map,
        wherein the light intensity image comprises light intensity values for pixels of the light intensity image,
        wherein the image property map comprises image property values for the pixels of the light intensity image, and
        wherein the confidence map comprises confidence values for the image property values;
    a filter circuit arranged to filter the image property map in response to the light intensity image and the confidence map,
        wherein the filter circuit is arranged to generate a filtered image property map,
        wherein the filter circuit is arranged to determine a combined neighborhood image property value in response to a weighted combination of neighborhood image property values for a first position in the filtered image property map,
        wherein the weighted combination of neighborhood image property values is image property values in a neighborhood around the first position, and
        wherein a weight for a first neighborhood image property value at a second position is dependent on a confidence value for the first neighborhood image property value and a difference between a light intensity value for the first position and a light intensity value for the second position;
    wherein the filter circuit is arranged to, determine the first filtered image property value for the first position as a combination of a first image property value at the first position in the image property map and the combined neighbor image property value for a first position in the filtered image property map, and
    wherein the filter circuit is arranged to determine the weight for the first neighborhood image property value in response to a difference measure for the confidence value for the first neighborhood image property value and a confidence value for the first image property value.

2. The apparatus of claim 1, wherein the filter circuit is arranged to determine a weight for the first image property value relative to a weight for the combined neighbor image property value in response to a confidence value for the first image property value.

3. The apparatus of claim 1, wherein the filter circuit is arranged to determine the combined neighbor image property value substantially as:

$$D_{neighbor} = \frac{\sum \alpha_j f_j g_j D_j}{\sum \alpha_j f_j g_j}$$

wherein $f_j$ represents a difference measure for a light intensity value for the second position and a light intensity value for a neighborhood image property value at the second position, wherein $g_j$ represents a confidence difference measure for the confidence value for the first depth value and a confidence value for the neighborhood image property value at the second position, wherein $D_j$ represents the neighborhood image property value at the second position, wherein $\alpha_j$ represents a design parameter, and wherein summations is over all positions j belonging to the neighborhood.

4. The apparatus of claim 1, wherein the determination of the weight is asymmetric with respect to the confidence value for the first neighborhood image property value and the confidence value for the first image property value.

5. The apparatus of claim 1, wherein the difference measure is limited to a minimum value when the confidence value for the first neighborhood image property value does not exceed the confidence value for the first image property value by a threshold and the difference measure exceeds the minimum value if the confidence value for the first neighborhood image property value exceeds the confidence value for the first image property value by the threshold.

6. The apparatus of claim 1,
    wherein the light intensity image, the confidence map, and the image property map are part of a temporal sequence of light intensity images, confidence maps, and image property maps, and
    wherein the neighborhood has a temporal extension.

7. The apparatus of claim 1, wherein the filter circuit is arranged to increase a confidence value for an image property value if this is a filtered image property value.

8. The apparatus of claim 1, wherein the neighborhood is spatially asymmetric with respect to the first position.

9. The apparatus of claim 8,
    wherein the image property map is a depth indication map,
    wherein the depth indication map comprises depth values determined from disparity estimation in a first image representing a first view point and a second image representing a second view point,
    wherein the depth indication map has the first view point as the basis for the disparity estimation, and
    wherein the neighborhood extends further in a direction from the second view point towards the first view point than in a direction from the first view point towards the second view point.

10. The apparatus of claim 1, wherein the weight is further dependent on a distance between the first position and the second position.

11. The apparatus of claim 1,
wherein the receiver circuit is further arranged to receive a second image property map and a second confidence map, wherein the second confidence map comprises second confidence values for second image property values of the second image property map,
wherein the filter circuit is arranged to determine the weight for the first neighborhood image property value in response to a second image property value for the second position, and
wherein the filter circuit is arranged to determine a second confidence value for the second position.

12. The apparatus of claim 1, wherein the image property map is selected from the groups consisting of a depth map, a disparity map, a motion estimation map, and a transparency map.

13. A method of processing an image property map, the method comprising:
receiving a light intensity image, a confidence map, and an image property map,
wherein the light intensity image comprises light intensity values for pixels of the light intensity image,
wherein the image property map comprises image property values for the pixels of the light intensity image, and
wherein the confidence map comprises confidence values for the image property values;
filtering the image property map in response to the light intensity image and the confidence map so as to generate a filtered image property map, wherein the filtering comprises determining a combined neighborhood image property value in response to a weighted combination of neighborhood image property values, for a first position in the filtered image property map,
wherein the weighted combination of neighborhood image property values is image property values in a neighborhood around the first position,
wherein the weight for a first neighborhood image property value at a second position is dependent on a confidence value for the first neighborhood image property value and a difference between a light intensity value for the first position and a light intensity value for the second position; and
determining a first filtered image property value for the first position as a combination of a first image property value in the image property map at the first position and the combined neighbor image property value,
wherein determining the combined neighborhood image property value comprises determining the weight for the first neighborhood image property value in response to a difference measure for the confidence value for the first neighborhood image property value and a confidence value for the first image property value.

14. A computer program product comprising computer program code stored in a non-transitory media, wherein the computer code is arranged to perform the method of claim 13 when the program is run on a computer.

15. The method of claim 13, wherein the filtering is arranged to determine a weight for the first image property value relative to a weight for the combined neighbor image property value in response to a confidence value for the first image property value.

16. The method of claim 13, wherein the filtering is arranged to determine the combined neighbor image property value substantially as:

$$D_{neighbor} = \frac{\sum \alpha_j f_j g_j D_j}{\sum \alpha_j f_j g_j}$$

Wherein $f_j$ represents a difference measure for a light intensity value for the second position and a light intensity value for a neighborhood image property value at the second position,
wherein $g_j$ represents a confidence difference measure for the confidence value for the first depth value and a confidence value for the neighborhood image property value at the second position,
wherein $D_j$ represents the neighborhood image property value at the second position,
wherein $\alpha_j$ represents a design parameter, and
wherein the summations is over all positions j belonging to the neighborhood.

17. The method of claim 13, wherein the determining of the weight is asymmetric with respect to the confidence value for the first neighborhood image property value and the confidence value for the first image property value.

18. The method of claim 13, wherein the difference measure is limited to a minimum value when the confidence value for the first neighborhood image property value does not exceed the confidence value for the first image property value by a threshold and the difference measure exceeds the minimum value if the confidence value for the first neighborhood image property value exceeds the confidence value for the first image property value by the threshold.

19. The method of claim 13,
wherein the light intensity image, the confidence map, and the image property map are part of a temporal sequence of light intensity images, confidence maps, and image property maps, and
wherein the neighborhood has a temporal extension.

20. The method of claim 13, wherein the filtering is arranged to increase a confidence value for an image property value if this is a filtered image property value.

* * * * *